United States Patent
Kuchenbrod

(10) Patent No.: US 11,265,455 B1
(45) Date of Patent: Mar. 1, 2022

(54) METHOD OF DIFFERENTIATING BETWEEN FOCUS DRIFT AND A CHANGE IN DISTANCE TO TARGET FOR VARIABLE FOCUS LENS

(71) Applicant: ZEBRA TECHNOLOGIES CORPORATION, Lincolnshire, IL (US)

(72) Inventor: Harry E. Kuchenbrod, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/364,581

(22) Filed: Jun. 30, 2021

(51) Int. Cl.
*H04N 5/232* (2006.01)
*G06T 7/73* (2017.01)
*H04N 5/369* (2011.01)

(52) U.S. Cl.
CPC ......... *H04N 5/232125* (2018.08); *G06T 7/74* (2017.01); *H04N 5/232127* (2018.08); *H04N 5/36965* (2018.08)

(58) Field of Classification Search
CPC ....... H04N 5/232125; H04N 5/232127; H04N 5/36965; G06T 7/74
USPC ........................................................ 348/349
See application file for complete search history.

(56) References Cited

U.S. PATENT DOCUMENTS

| | | | | |
|---|---|---|---|---|
| 7,643,745 B2* | 1/2010 | Hyatt | ............... | H04N 5/232123 396/137 |
| 9,418,284 B1* | 8/2016 | Houri | ................. | H04W 4/029 |
| 9,679,175 B2* | 6/2017 | Lei | ....................... | G06K 7/10732 |
| 10,146,975 B2* | 12/2018 | Canini | ............... | G06K 7/10722 |
| 10,534,942 B1* | 1/2020 | Cornell | ................ | G06K 7/1413 |
| 10,986,279 B1* | 4/2021 | Walden, II | .............. | G06T 7/215 |
| 2004/0118926 A1* | 6/2004 | Yavid | .................... | G06K 7/0008 235/462.23 |
| 2007/0119941 A1* | 5/2007 | He | .......................... | G06K 7/10 235/462.15 |
| 2008/0031610 A1* | 2/2008 | Border | ............. | H04N 5/232123 396/89 |
| 2008/0277477 A1* | 11/2008 | Thuries | .............. | G06K 7/10811 235/462.23 |
| 2011/0101101 A1* | 5/2011 | Ye | ............................ | G06K 7/14 235/462.11 |
| 2011/0290886 A1* | 12/2011 | Carlson | ............. | G06K 7/10722 235/462.24 |
| 2014/0166758 A1* | 6/2014 | Goren | ................ | G06K 7/10801 235/462.21 |

(Continued)

*Primary Examiner* — Pritham D Prabhakher
(74) *Attorney, Agent, or Firm* — Yuri Astvatsaturov

(57) ABSTRACT

A method and apparatus for differentiating focus drift of an imaging system from position changes of an object of interest. The method includes obtaining an image of an object of interest and identifying a region of interest in the image, wherein the region of interest contains an indicia indicative of the object of interest. The processor determines an image quality of the image and analyzes the indicia and determines a pixel measurement of the indicia. The processor then compares the pixel measurement of the indicia to a reference pixel measurement. Based on the comparison, the processor determines that the image quality of the image results either from a difference in a distance of the object from the imaging system or from focusing drift of the imaging system.

8 Claims, 7 Drawing Sheets

(56) References Cited

U.S. PATENT DOCUMENTS

| | | | | |
|---|---|---|---|---|
| 2014/0226003 | A1* | 8/2014 | Phaneuf | H01J 37/3005 |
| | | | | 348/80 |
| 2017/0357035 | A1* | 12/2017 | Nunnink | G02B 7/08 |
| 2018/0137318 | A1* | 5/2018 | Canini | G06K 7/10811 |
| 2020/0045237 | A1* | 2/2020 | Miyazawa | H04N 5/232123 |
| 2021/0112203 | A1* | 4/2021 | Walden, II | H01J 37/222 |

\* cited by examiner

METHOD OF DIFFERENTIATING BETWEEN FOCUS DRIFT AND A CHANGE IN DISTANCE TO TARGET FOR VARIABLE FOCUS LENS

BACKGROUND OF THE INVENTION

Devices such as barcode scanners are used in various inventory applications. In some configurations, these barcode scanners use internal auto-focus cameras to capture images of barcodes and other scannable indicia. Electrically tunable variable focus lenses allow for auto-focusing of a barcode scanner on objects of interest (OOI) in machine vision and bar-code scanning applications. One drawback of electrically tunable variable focus lenses is that they do not provide any feedback signal indicative of a current focus, or current optical power, which can change over time due to ambient temperature variation, lens aging, voltage drift, and other factors. The change in the camera focus results in misreads or the inability of an autofocus camera to scan an OOI at a designated distance or range of distances. Also, the location of an OOI in a field of view may change, such as on a conveyer belt, and an autofocusing scanner Is unable to determine if an OOI is out of focus due to a change in the distance of the OOI, or if the imaging system has undergone focus drift. Furthermore, the need for accurate and fast focusing on varied objects adds considerable processing complexity and mechanical componentry to autofocusing camera systems, all of which increase costs.

Autofocus imaging systems with liquid lenses typical perform any type of focus tuning at job setup and require the focus to be held indefinitely. During operation the focus of the autofocus system may change or shift due to age, humidity, and temperature among other factors. The inability of systems to determine whether the focus of the system has shifted, or if an object distance has changed may cause a system to perform a focus shift when it is unnecessary which may cause the OOI to be further out of focus. Additionally, any focus compensation or tuning of a system causes a reduction in scanning rates which reduces the efficiency of the imaging system.

Accordingly, there is a need for determining if a focus drift has occurred, and also for correcting for any potential focus drift for imaging capture systems such as barcode readers.

SUMMARY

In an embodiment, the present invention is a method for correcting focus drift of an imaging system. The method includes obtaining, by the imaging system, a first image of an object of interest, the first image obtained with the imaging system having a focus at a near focal plane distance; obtaining, by the imaging system, a second image of a second object of interest, the second image obtained with the imaging system having a focus at a far focal plane distance, and wherein the near focal plane distance and far focal plane distance bound a focus distance band which includes a central focal plane distance; determining, by a processor, a first image property value of the first image and a second image property value of the second image; determining, by a processor, an image quality metric from the first and second image property values; comparing, by the processor, the image quality metric to a reference metric; and based on the comparison, (i) determining, by the processor, that a focus drift has not occurred when the image quality metric is within a threshold of the reference metric, or (ii) determining, by the processor, that a focus drift has occurred when the image quality metric is greater than the threshold of the reference metric, and adjusting, by the imaging system, a central focal plane distance of a variable focus lens of the imaging system according to the focus drift.

In a variation of this embodiment, the method may further include obtaining, by the imaging system, a first reference image of a reference object, the first reference image obtained with the imaging system having a focus at the near focal plane distance; obtaining, by the imaging system, a second reference image of the reference object, the second reference image obtained with the imaging system having a focus at the far focal plane distance; determining, by a processor, a first reference image property value of the first reference image and a second reference image property value of the second reference image; and determining, by a processor, the reference metric from the first and second reference image property values.

In yet another variation of the current embodiment, determining the image quality metric includes determining one of a difference between the first and second image property values, an addition of the first and second image property values, a quotient of the first and second image property values, or an average of the first and second image property values. In further variations, determining the image quality metric includes determining one of a difference between the first and second image property values, an addition of the first and second image property values, a quotient of the first and second image property values, or an average of the first and second image property values.

In another embodiment, the present invention is a computer-implemented method for differentiation focus drift of an imaging system from position changes of an object of interest. The method includes obtaining, by the imaging system, an image of an object of interest; identifying, by the processor, a region of interest in the image, wherein the region of interest contains an indicia indicative of the object of interest; determining, by the processor, an image quality of the image; analyzing, by the processor, the indicia and determining a pixel measurement of the indicia, and comparing, by the processor, the pixel measurement of the indicia to a reference pixel measurement; and based on the comparison, determining, by the processor, that the image quality of the image results from a difference in a distance of the object from the imaging system and a reference distance from the imaging system when the pixel measurement is outside of a threshold of the reference pixel measurement, and determining that the image quality of the image results from focusing drift of the imaging system when the pixel measurement is within a threshold of the reference pixel measurement.

In a variation of the current embodiment, method further includes obtaining, by the imaging system, an image of the reference indicia; and performing, by the processor, the reference pixel measurement on the reference indicia. In further variations of the current embodiment, the method includes determining, by the processor and from the pixel measurement, a distance of the object of interest away from the imaging system; and wherein comparing the pixel measurement to the reference pixel measurement includes comparing, by the processor, the distance of the object of interest with a reference distance, the reference distance determined from the reference pixel measurement.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
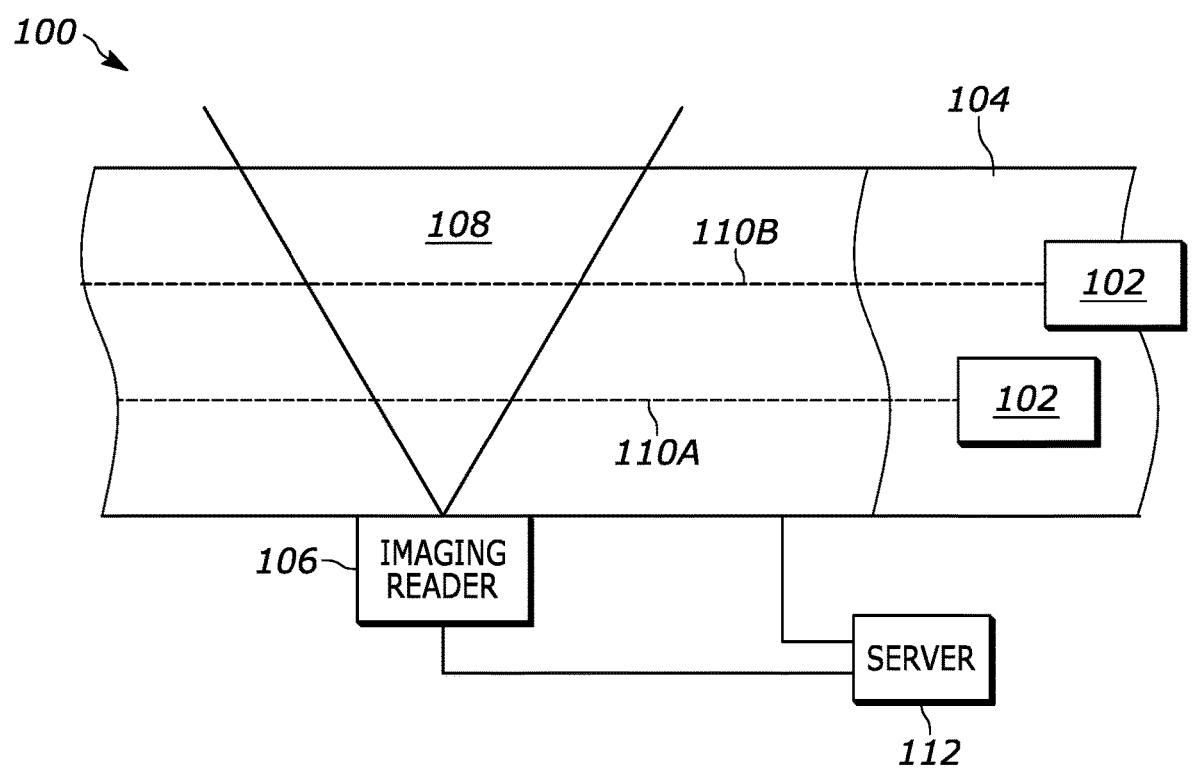
FIG. 1 illustrates a variable focus scanning station, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electrically controlled variable focus (VF) lenses are convenient, low-power solutions for fast auto-focus (AF) on objects of interests (OOI) in machine vision and bar-code applications. However, when location of objects of interest in the field of view varies (e.g., parts moving on conveyor, a person moving an object across a scanner field of view, etc.) an AF imaging system may be unable to determine the OOI, or if the OOI is at a different distance from the imaging system. In many scanning applications, it is desirable to keep focus plane constant. VF lenses do not provide any feedback signal indicating a current optical power or focus which can change after initial settings due to ambient temperature variation, aging, and other factors. The proposed system and method allow for the system to determine if a focus shift has occurred, or if the OOI is at a different distance from the imaging system. The disclosed system and methods also enable the correction of focus drift of an imaging system utilizing a VF lens.

The disclosed system and methods propose to obtain images of one or more OOI's and determine whether an image quality of the obtained images is due to a difference in OOI distance, or due to focus drift of the imaging system. The method may use a pixel measurement of one or more of the images to determine whether a focus drift has occurred.

Further, the system and methods disclosed enable correcting for focus drift of an imaging system. The methods include obtaining images of an OOI at different focuses of the imaging system, and determining image property values for the different images. The image property values are compared, a focus drift is determined, and the focus of the imaging system is adjusted according to the determined focus drift.

Referring now to the drawings, FIG. 1 illustrates an exemplary environment where embodiments of the present invention may be implemented, including the processes described and illustrated herein. In the present example, the environment is provided in the form of a scanning station 100 where goods 102 are moved across or along a scanning surface 104 and are scanned by an imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station 100 is part of an inventory delivery system, where goods are conveyed by the scanning surface or across the scanning surface to monitor and control delivery of the goods, for example, shipping goods from a facility or receiving shipped goods to a facility.

The scanning surface 104 may be a stationary surface, such that the goods 102 are manually moved relative to the surface 104. In embodiments, the scanning surface 104 may move the goods 102 or be moved by another automated means. In other embodiments, the scanning surface 104 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 102 may be moved continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 at any distance from the imaging reader 106.

In some exemplary embodiments, the imaging reader 106 includes a variable focus imaging system, in which the reader 106 continuously scans for an object of interest (OOI) (such as the goods 102), in its field of view until the object, or a region of interest of the OOI (e.g., a barcode, serial number, other identifiers, etc.) is located and then brought sufficiently into focus on the imaging sensor. With at least some embodiments of the present invention, the imaging reader scans for the object (e.g., goods 102) only at discretized, determined distances, corresponding to imaging planes of the imaging reader 106. Instead of continuous scanning, the imaging reader 106 more quickly captures images at one or more predetermined imagining planes. The imaging planes are defined relative to the imaging reader 106. For illustration purposes, in FIG. 1 imaging planes happen to coincide with paths (e.g., 110A, 110B, etc.) over which the goods 102 traverse. Although, it is more likely the case that the imaging planes will not exactly coincide with the scan path of goods. While, in FIG. 1, the imaging reader 106 is depicted as being to the side of the goods 102, in embodiments, the imaging reader 106 may be positioned directly above the goods 102, above the goods 102 in front of or behind the goods 102 configured to image the OOI, or at another positon for imaging a region of interest of the goods 102 or any OOI. The imaging reader 106 captures images at each of the imaging planes, where the captured images of the good will vary in focus depending on where the good (and its scan path) is relative to the imaging reader 106. That is, the good will appear more in focus at some imaging planes in comparison to others. By capturing images of the goods at only certain imaging planes, the imaging reader 106 is able to identify the goods 102 much faster than a conventional autofocus system. Indeed, the imaging reader 106 can be configured such that if it has an autofocus operation that operation is disabled, and instead images are captured at specific imaging planes irrespective of which scan path the good traverses and without needing to continuously detect the good and autofocus onto the good. This operation greatly reduces power consumption demands on the imaging reader 106.

As previously described, electrically tunable AF lenses may undergo focus plane drift due to environmental and other factors, which causes the defocusing of images of OOI reducing the efficacy of the VF imaging reader 106. As discussed further herein, the identification and scanning efficiencies can be increased having the imaging reader 106 actively determine if a focus drift has occurred, and actively determine and correct for the focus drift. The disclosed systems and methods enable the increased efficiency, and therefore reduced time required, for reading identifiers on an OOI, e.g., to identify an indicia or other barcode on the good. At least some of the image quality metrics and parameters, scanning parameters, and/or calibration parameters described further herein, may be stored on a server 112 communicatively coupled to the imaging reader 106, and the imaging reader may retrieve the image quality metrics and parameters, scanning parameters, and/or calibration parameters, from the server or another memory or form of storage.

Figure 2:
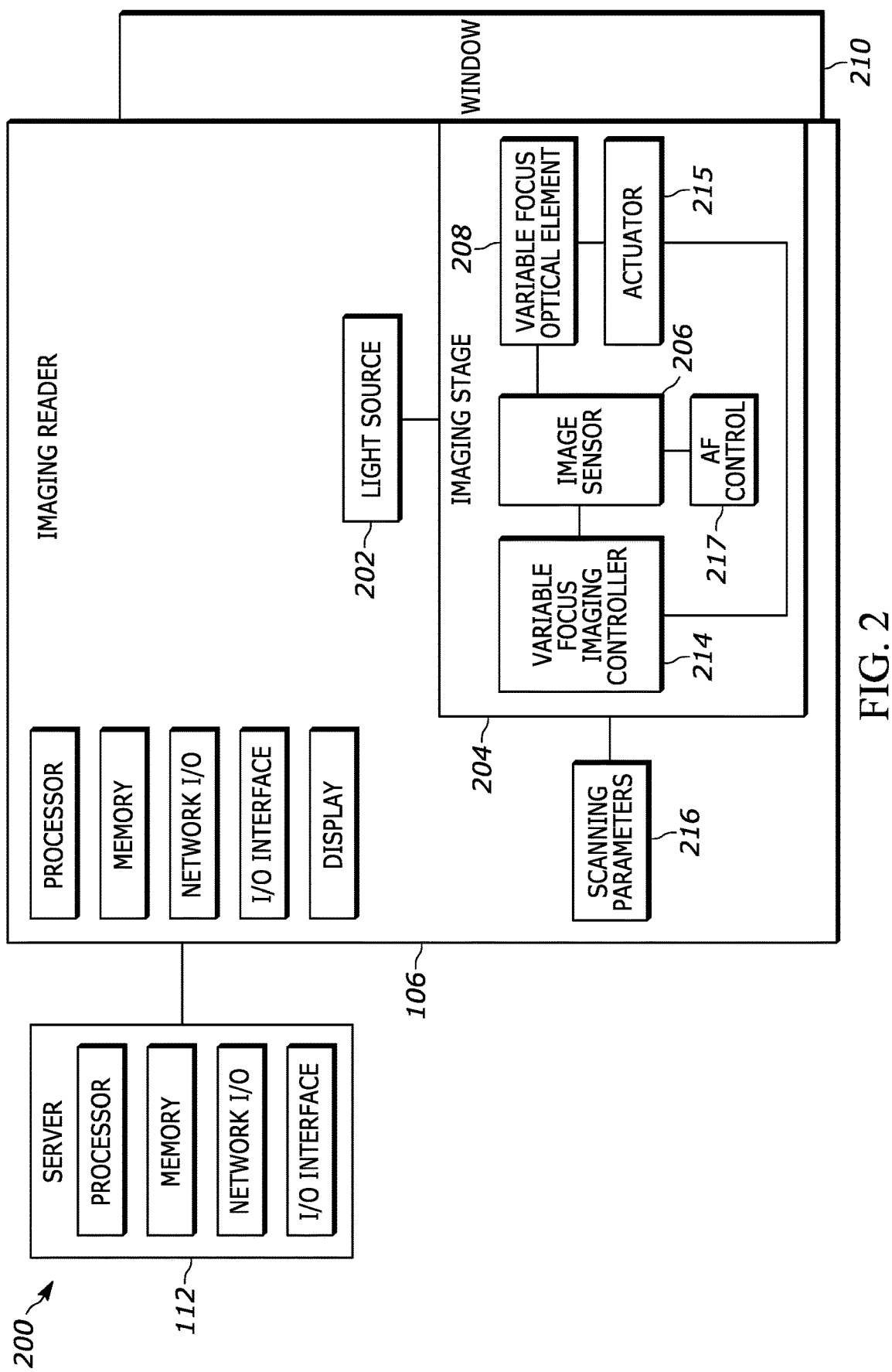
FIG. 2 is an exemplary block diagram schematic of an imaging reader of the variable focus scanning station of FIG. 1, in accordance with an embodiment of the present invention.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target, such as the goods 102 or another OOI, within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one or more discrete imaging planes for the imaging sensor. The one or more discrete imaging planes may be considered one or more central focal planes as described here. As previously described, a central focal plane is the imaging plane that is expected to result in the greatest image edge sharpness value.

In the illustrated example, the controller 214 is coupled to the variable focusing optical element 208 through an actuator control unit 215 and bypasses an optional autofocus control unit 217, thereby providing faster image capture at the desired imaging planes by overriding the slower autofocus control units of conventional systems. In exemplary embodiments, the imaging reader 106 does not have an autofocus control unit or any autofocus functionality. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc.

The VF optical element 208 may be a deformable lens element, a liquid lens, a T-lens or another VF optical element. In some embodiments, the optical element includes a voice coil actuator motor in the actuator 215 that is controllably adjusted by the controller 214. In exemplary embodiments, such as some barcode scanning applications, the VF optical element 208 has an aperture from 1.5 mm to 3 mm. In some embodiments, the image stage 204 is implemented as part of a VF camera assembly.

In embodiments, the VF imaging controller 214 is configured to access one or more scanning parameters 216 stored in the imaging reader 106, stored on the server 112, or stored on another medium. From these scanning parameters 216, the controller 214 determines the number of discrete central focus imaging planes at which the imaging reader 106 scans for and captures images of the target or an OOI (such as goods 102). The controller 214 further determines the distance of each of those central focus imaging planes, as measured from the imaging sensor 206. The controller 214, for example, may determine the number and distance of the central focus imaging planes so that the entire working range 108 is covered by five (5) or fewer imaging planes. In some examples, depending on the scanning parameters 216, the number of central focus imaging planes may be three (3) or fewer.

The imaging controller 214 converts these determined central focus imaging planes and central focal distances into parameters or instructions for controlling the actuator 215 for controlling the variable focus optical element 208.

In exemplary embodiments, the variable focus imaging controller 214 has hands-free mode in which the variable focus optical element 208 and the imaging sensor 206 are controlled to capture an image of the target at each of the central focus imaging planes within the working range in an ordered manner to form a set of captured images of the target, stored in the memory. In some embodiments, that ordered manner is a sequential order, such as from nearest central focus imaging plane to farthest or vice versa, as measured from the imaging sensor 206.

In some exemplary embodiments, the imaging reader 106 is implemented in a handheld bar code scanner device. When the handheld scanner is placed within a stationary cradle thereby establishing an upright scanning position, the handheld scanner may automatically sense that placement and enter the hands-free mode. In other exemplary embodiments, the imaging reader 106 is implemented as a multi-plane scanner, such as a bioptic scanner as shown in FIG. 3.

In exemplary embodiments, the variable focus optical element 208 is discretely controlled to hop to each central focus imaging plane, avoiding a sweeping operation between imaging planes.

In embodiments, the imaging sensor 112 may be a charge coupled device, or another solid-state imaging device. The imaging sensor 112 may be a one megapixel sensor with pixels of approximately three microns in size. In embodiments, the imaging sensor 112 includes a sensor having an active area of 3 millimeters, 4.5 millimeters, 5 millimeters, 6.8 millimeters, 7.13 millimeters, less than 5 millimeters, less than 10 millimeters, or less than 50 millimeters. The imaging sensor 112 may have a total of about 1 megapixels, 2 megapixels, 2.3 megapixels, 5 megapixels, 5.1 megapixels or more than 5 megapixels. Further, the imaging sensor 112 may include sensors with pixels having dimensions of less than 10 microns, less than 5 microns, less than 3 microns, or less than 2 microns in size in at least one dimension of the pixel. In embodiments, the lens assembly is configured to capture images with a modulation transfer function of 40% at 160 line pairs per millimeter.

Figure 3:
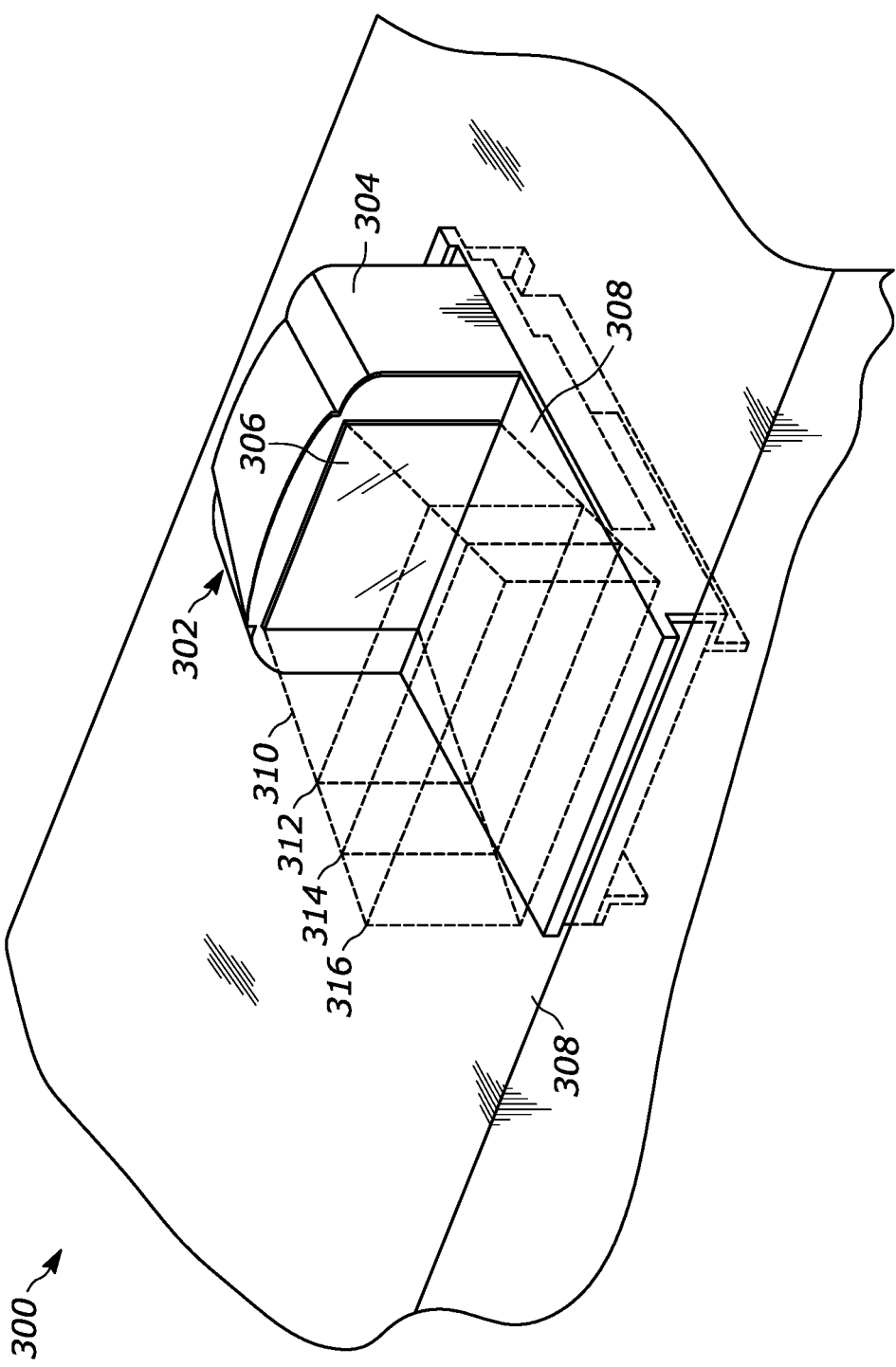
FIG. 3 illustrates a perspective view of another variable focus scanning station with variable determined imaging planes, in accordance with an embodiment of the present invention.

FIG. 3 illustrates an exemplary scanning station 300 having an imaging reader 302, in the form of a bioptic scanner, having a housing 304 and a first scanning window 306 behind which is an illumination source (not shown) and an imaging stage (not shown) like that of FIG. 2. The imaging reader 302 is positioned adjacent a scanning surface 308 and defines a horizontally and vertically extending working range 310 illuminated by the imaging reader 302 and having defined therein 3 defined middle imaging planes 312, 314, and 316 at which the imaging reader 302 captures images of an object for identification and imaging. For clarity and simplicity, a single central imaging plane will be further used in descriptions of the systems and methods for determining if a focus shift has occurred, and for correcting the focus shift. It should be understood that the systems and methods are not limited to a single central focus imaging plane, and that the disclosed systems and methods may be applied for determining and correcting focus shift for any number of focus imaging planes as practicable by the limitations (i.e., imaging camera resolution, imaging system working range, illumination capabilities, etc.) of the imaging system.

Figure 4:
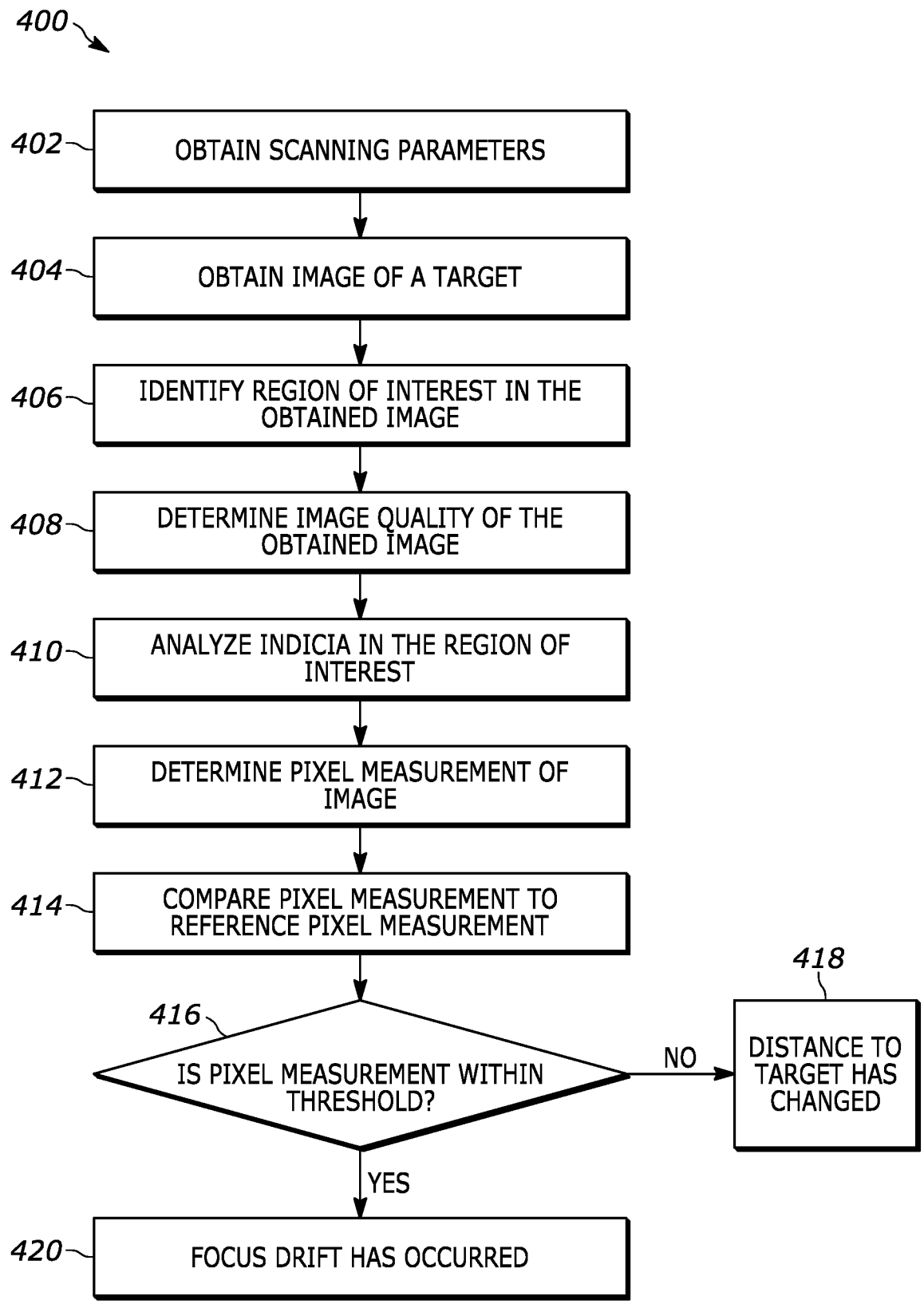
FIG. 4 is a flowchart representative of a method for differentiating focus drift of an imaging system from a position change of an object of interest.

FIG. 4 illustrates a method 400 of differentiating focus drift of an imaging system from a position change of an object of interest. The method 400 may be implemented in systems exhibiting a small image sharpness tolerance (i.e. a required minimum sharpness is less than 20% of the maximum image sharpness), systems with a relatively a slow conveyor speeds, and/or relatively low image frame rates wherein several non-decoded frames are acceptable while maintaining a 100% decode rate, resulting in identification and decoding of indicia indicative of all OOIs. The method 400 may be implemented by the imaging readers 106 and 302 of any of FIGS. 1-3, for example. In the example of a handheld scanner, initially, the imaging reader enters a hands-free mode indicating that swipe scanning is to be performed. In some examples, the handheld scanner includes a trigger on or near a handle, and the trigger, when depressed, enters the scanner into the hands-free mode for swipe scanning. In some embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIG. 1. Therefore, the imaging scanner of FIG. 1 may operate mainly in the hands-free mode, and a manual mode may be activated for manual scanning and/or calibration purposes. Further, the methods described herein may be implemented with the scanner of FIG. 1 being an inspection station where on OOI moves into a field of view of the scanner, the OOI pauses momentarily in the field of view to be imaged, and then the OOI moves out of the field of view.

For simplicity the method 400 will be described in reference to components of FIGS. 1 and 2, but it should be understood that the method 400 may be performed for any imaging system for scanning a target or object of interest. The imaging reader 106 obtains scanning parameters at block 402. In exemplary embodiments, the scanning parameters include frame rate of the image sensor of the imaging reader, exposure time of that image sensor, the aperture or aperture range of the variable focus optical element, the swipe speed of movement of the target, an automatic movement speed of a conveyer belt or other speed of a means for automatic swiping, a size of the working distance, a nearest distance of the working distance, a farthest distance of the working distance, and/or focusing time of the variable focus optical element. Such parameters may be stored within the imaging reader 106, for example, in memory of the imaging reader, and/or one or more of the scanning parameters may be stored in another system such as at the server 200. Further, one or more of the scanning parameters may be stored in individual elements of the imaging reader 106 such as in the variable focus optical element 208, variable focus imaging controller 214, and/or other elements of the imaging reader 106.

In some embodiments, the scanning parameters are target specific parameters, such as the types and/or sizes of the targets to be scanned. In some embodiments, the scanning parameters include the types of indicia on the targets, such as whether the targets contain 1D or 2D barcodes, QR codes, UPC codes, or other identifying indicia.

In some embodiments, the obtaining the scanning parameters may include obtaining calibration parameters. The calibration parameters may include one or more defocus parameters, near focus plane parameters, central focus plane parameters, and far focus plane parameters. In some embodiments, the calibration parameters may include scanning parameters for determining the near, center, and far focus planes. In some examples, some scanning parameters and calibration parameters are obtained from the imaging reader communicating with a server, such as the server 112, which may include an inventory control manager that access information on targets and OOIs.

The variable focus imaging controller 214, at 404, controls the imaging sensor 206 to obtain an image of a target OOI, such as the goods 102. The variable focus imaging controller 214 may assess the obtained scanning parameters and control the image sensor, variable focus optical element, and other components of the imaging reader 106 according to the scanning parameters to obtain the image. The processor of the imaging reader 106, at 406, identifies a region of interest in the captured image. The region of interest in the image may include a barcode, a serial number, alphanumeric, a graphic, or another indicia indicative of the target or OOI.

At 408, the processor of the imaging reader 106 analyzes the image and determines an image quality of the image. For example, at 408, the processor may analyze the image of the OOI by performing image processing on the image. The image processing may include applying a spatial lowpass filter, spatial highpass filter, Fourier lowpass or highpass filter, performing a noise reduction, a scaling, rotation, shearing, reflection, or another image filtering or image processing technique. Additionally, analyzing the image, and determining image quality value for the image may include determining a sharpness value, a contrast value, an image resolution, a spatial frequency content value, a noise measurement value, a dynamic range value, a measurement of image distortion, a blur value, a pixels per module value, a modulation transfer function, or another value associated with an image or image quality.

Figure 5A:
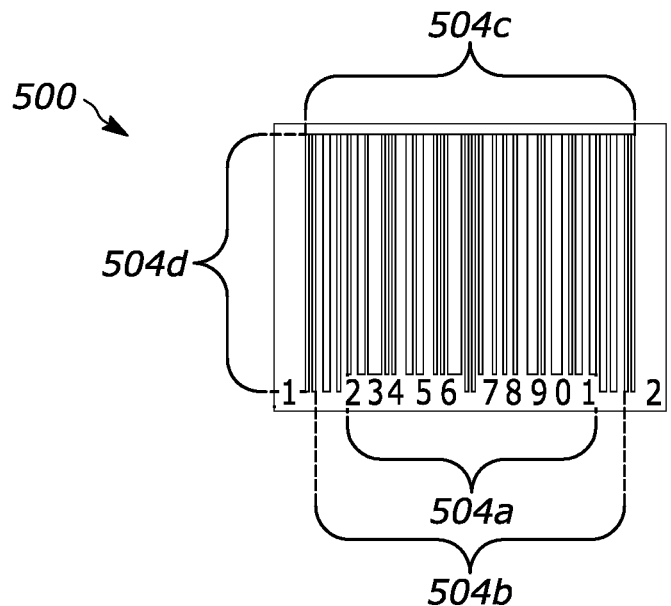
FIG. 5A is an image of an example indicia as a barcode scanned by an imaging reader.
Figure 5B:
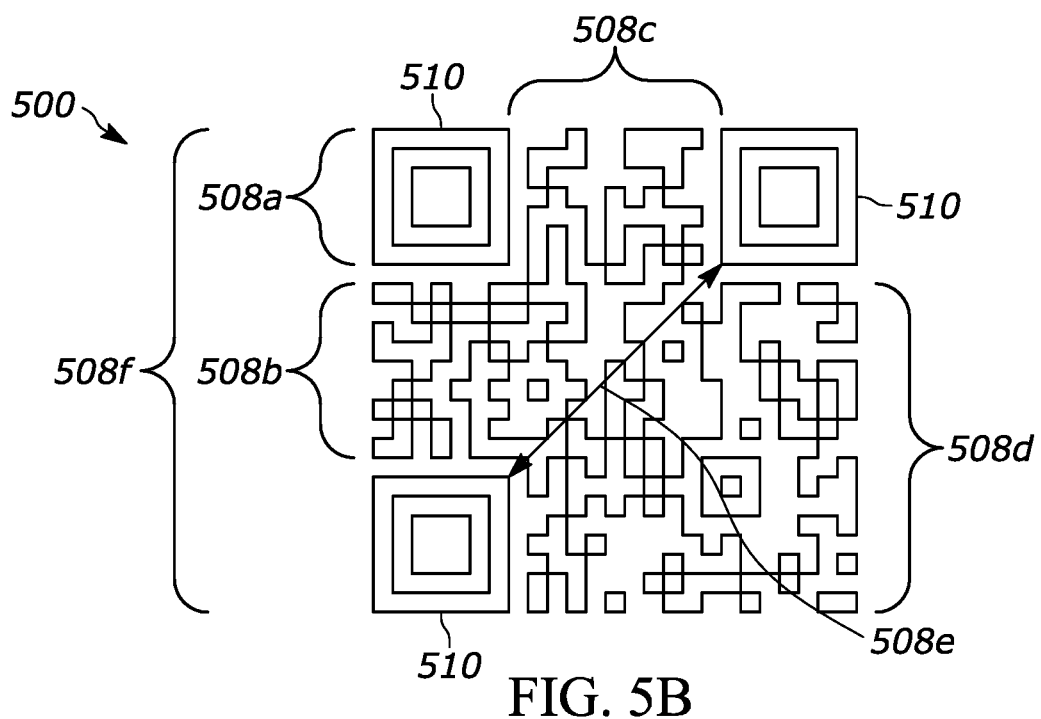
FIG. 5B is an example image of an indicia as a QR code scanned by an imaging reader.

The description of method 400 of FIG. 4 is continued with additional reference to FIGS. 5A and 5B. FIG. 5A is an example image of an example indicia 500 as a barcode scanned by the imaging reader 106, and FIG. 5B is an example image of the indicia 500 as a QR code scanned by the imaging reader 106. While illustrated as an example barcode and QR code, the indicia 500 may be a 1D or 2D barcode, another barcode, a static !R code, a dynamic QR code, a UPC code, a serial number, an alphanumeric code, or another indicia indicative of an OOI. At block 410, the processor analyzes the indicia 500 in the region of interest and at block 412, the processor determines a pixel measurement of the indicia 500. To analyze the indicia 500, the processor may perform image processing on the region of interest to determine features of the indicia 500 for determining the pixel measurement. For example, the processor may sharpen the image and perform edge detections on the image to determine pixels of the image of the indicia 500 for performing the pixel measurement. While the example of sharpening and performing edge detection is one example, the processor may perform other image processing and analysis of the image of the indicia 500 for further determining the pixel measurement. For example, the pixel measurement may include one or more of measuring a pixel sharpness, contrast, edge detection, size, pixel resolution, spatial frequency content, image or spatial noise, dynamic range, measurement of image distortion, blur, pixels per module, rotation normalization, or another value associated with pixels of an image or image quality.

In determining the pixel measurement, the processor may determine a pixel distance that is measured in a pixels per module (PPM). The PPM value of the image of the indicia 500 may be approximately 0.7 to tens of pixels per module. In embodiments, the described methods are applied with values of approximately 5±0.5 PPM, or with values of less than 5 PPM. To perform the pixel measurement, the processor may determine a pixel distance between subgroups of bars of the barcode, e.g., the pixel distance 504a and 504b, the pixel distance may be a pixel distance across an entire dimension of the image of the barcode, e.g. the pixel distances 504c and 504d, or may be another pixel distance in the image of the barcode of FIG. 5A. In the example of the QR code illustrated in FIG. 5B, the pixel distance may be determined to be the pixel distance 508a along a dimension of a position detection pattern, a distance 508b of a data area between position detection patterns 510, an entire distance 508c between position detection patterns, a distance 508d from a position detection pattern 510 to an edge of the QR code, a distance 508e diagonally across data between position detection patterns 510, a distance 508f across the entire length of a dimension of the QR code, a distance (not illustrated) diagonally across the entirety of the QR code, a distance across a subregion of the barcode, or another distance of the image of the barcode that is measurable in a number of PPM. Further, while not illustrated, the processor may perform a pixel measurement that may determine a pixel distance between or across multiple modules, a timing pattern, one or more alignment patterns, regions of code format information, across error correction patterns, format information, version information, or other data patterns of the QR code.

At 414, the processor of the imaging reader 106 compares the pixel measurement to a reference pixel measurement. For example, the reference pixel measurement may be a scanning parameter obtained at block 402, and the reference pixel measurement may be indicative of a pixel measurement of an indicia that is focused and at a focal plane of the imaging system. The reference pixel measurement may be a reference pixel measurement of a barcode, QR code, UPC codes, or other identifying indicia. The reference pixel measurement may be stored in a memory of the imaging reader 106, or another memory wherein the reference pixel measurement is retrievable by the imaging system. The reference pixel measurement may be a numerical value, image data indicative of a reference image of indicia, or another form of data for comparing the pixel measurement to. In embodiments, the method 400 may further include determining the reference pixel measurement. For example, the imagining reader 106 may obtain a reference image of a reference indicia. The reference indicia may be placed at a reference or calibrated distance from the imaging reader 106, for example, the reference indicia may be placed at one of the linear paths 110A or 110B. The processor may then perform image processor and analysis of the image of the reference indicia, and the processor may perform the reference pixel measurement and determine a reference pixel distance.

Based on the comparison of the pixel measurement with the reference pixel measurement, at 416, the processor determines if the image quality of the image results from a difference in a distance of the OOI (e.g., the goods 102) from the imaging reader 106 (e.g., from the imaging sensor 206 of the imaging system), or from a focus drift of the imaging reader 106. The reference pixel measurement may be a pixel distance with a PPM value of less than 1, of less than 10, or on the order of tens of PPM. Further the tolerance of the PPM may be less than ±1, less than ±5, or less than ±10 PPM. At block 418, the processor determines that the image quality is due to a change in the distance of the OOI from the imaging reader 106 when the pixel measurement is outside of the range of the threshold of the reference pixel measurement. At block 420 the processor determines that the image quality of the image is due to a focus drift of the imaging reader 106 when the pixel measurement is within the threshold range of the reference pixel measurement. Further, in embodiments wherein the pixel measurement includes a pixel distance between pixels of the image, or the region of interest of the image, at block 418 the processor may determine that the image quality is due to a change in the distance of the OOI from the imaging reader 106 when the pixel distance is outside of the range of the threshold of the reference pixel distance, and at block 420 the processor determines that the image quality of the image is due to a focus drift of the imaging reader 106 when the pixel distance is within the threshold range of the reference pixel distance.

In embodiments, the method 400 may further determine a physical distance of the OOI from the imaging reader 106. For example, one or more of the obtained scanning parameters may include a reference distance as a calibration parameter. The reference distance may be a known or calibrated distance of reference indicia used to determine the reference pixel measurement. The processor, may compare the pixel measurement to the reference pixel measurement and the distance of the OOI may be determined from the comparison. The processor may determine that the OOI is closer to or further from the imaging reader 106 by an amount of distance based on a difference between the pixel measurement and the reference pixel measurement (e.g., a difference between PPM values). The processor may determine that the OOI may be further to the imaging reader 106 if the pixel measurement results in a lower PPM value than the reference pixel measurement, or that the OOI is closer from the imaging system in the pixel measurement is greater than the reference pixel measurement. The distance of the OOI may be determined without the use of a reference distance. For example, by knowing specific parameters of optical elements of the imaging reader 106, such as lens focuses in diopters, angles of fields of view, and other geometries and optical parameters the distance of the OOI can be determined.

Further, it should be noted that the distance of the OOI from the imaging reader 106 is also dependent on where the OOI is in the FOV of the imaging reader 106. For example, the OOI may be further from the imaging reader 106 near edges of the FOV, while the OOI may be closest to the imaging reader 106 at a center of the FOV of the imaging reader 106. The position of the OOI and distance from the imaging reader 106 may be considered when determining if a distance to the OOI has changed, or if a focus drift has occurred in the imaging reader 106.

Further, at blocks 414 and 416, to compare the pixel measurement and reference pixel measurement, the processor may compare a determined distance of the OOI and a reference distance. The processor may then determine, at block 418, if the image quality is due to a change in the distance from the OOI to the imaging reader 106 when the determined distance of the OOI is outside of a threshold of the reference distance. Alternatively, the processor may determine that the image quality is due to a focus drift of the imaging reader 106 if the distance of the OOI is within the threshold of the reference distance.

Figure 6:
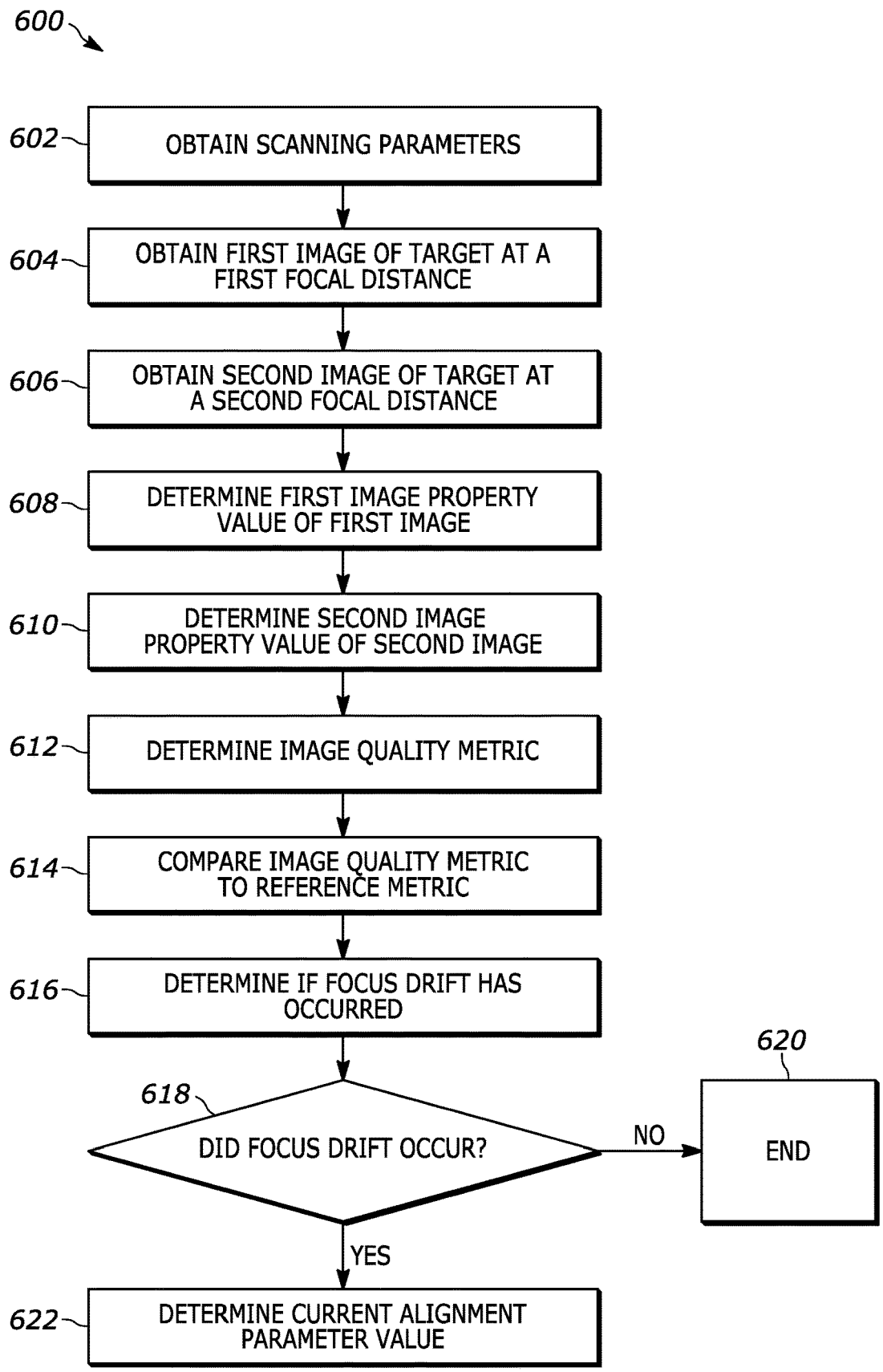
FIG. 6 is a flowchart representative of a method for correcting focus drift in an imaging system.
Figure 7:
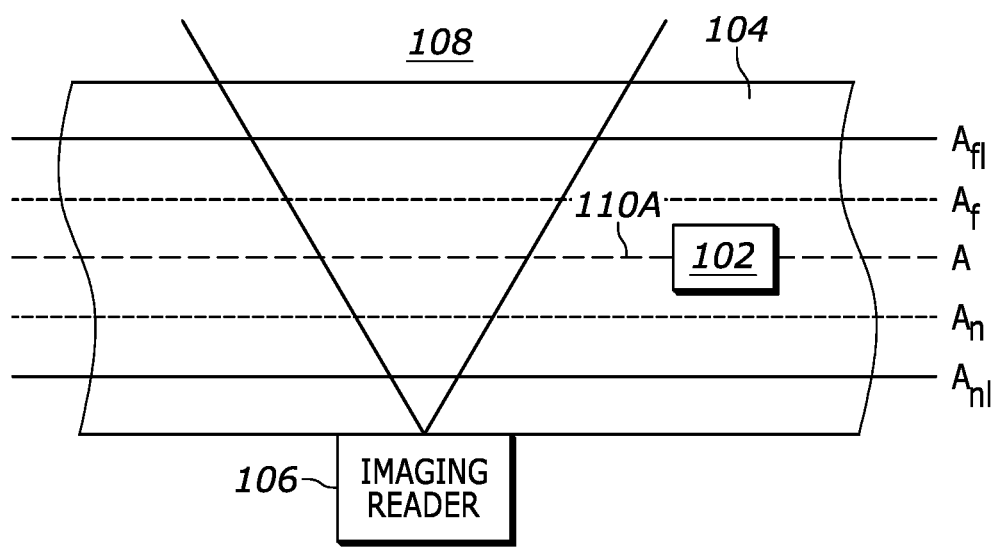
FIG. 7 illustrates a variable focus scanning station imaging reader having multiple focal planes for performing the method of FIG. 6.

FIG. 6 is a flowchart representative of a method 600 for correcting focus drift in an imaging system. The method 600 may be implemented in systems exhibiting a small image sharpness tolerance (i.e. a required minimum sharpness is less than 20% of the maximum image sharpness), systems with relatively slow conveyor speeds, and/or relatively low image frame rates while maintaining a 100% decode rate, resulting in identification and decoding of indicia indicative of all OOIs. The method 600 may be implemented by the imaging readers 106 and 302 of any of FIGS. 1-3, for example. FIG. 7 illustrates a variable focus scanning station imaging reader 106 and multiple focal planes for imaging of goods 102 and for performing the method 600 of FIG. 6. For simplicity the method 600 will be described in reference to components of FIGS. 1, 2 and 7, but it should be understood that the method 600 may be performed for any imaging system for scanning a target or object of interest.

The imaging reader 106 obtains scanning parameters at block 602. Such parameters may be stored within the imaging reader 106, for example, in memory of the imaging reader, and/or one or more of the scanning parameters may be stored in another system such as at the server 200. Further, one or more of the scanning parameters may be stored in individual elements of the imaging reader 106 such as in the variable focus optical element 208, variable focus imaging controller 214, and/or other elements of the imaging reader 106. Various components including the variable focus imaging controller 214, AF control 217, actuator 215, and processor of the imaging reader 106 may obtain and/or assess the scanning parameters for performing image scans and obtaining images of an OOI. The processor assesses the scanning parameters and determines a center focus plane A along the substantially linear path 110A, a near focus plane $A_n$, and a far focus plane $A_f$, each having its own respective optical focus determined by the controller and each at a corresponding distance from the imaging reader 106. The near focus plane is closer to the imaging reader 106 than the center focus plane, and the far focus plane is further from the imaging reader 106 than the center focus plane. In examples, the near focus plane and far focus plane may be equally distance from the center focus plane. In other examples the near focus plane and far focus plane may be at different distances from the center focus plane. In the described methods, the near focus plane and far focus planes are two imaging planes at which the imaging reader 106 will capture images of the target for detecting and correcting focus drift imaging reader 106. In some embodiments, the scanning parameters may include parameters for determining more than two or three focus planes for obtaining images for detecting and correcting focus drift of the imaging reader 106.

The scanning station further has a near focus limit $A_{nl}$ and a far focus limit $A_{fl}$. The near and far focus limits are predetermined minimum focal plane and maximum focal plane distance thresholds that are limits of the focus of the imaging reader 106, outside of which the imaging and decoding of indicia of the imaging reader degrades. For example, the imaging reader 106 may be able to image and decode images of indicia captured between the near and far focus limits, while the imaging reader 106 is unable to efficiently decode images of indicia obtained outside of the near and far focus limits. As described herein, efficient decoding of images of indicia may include a decode efficiency of 100%, of greater than 90%, or of greater than 75%. In embodiments, the near focus plane and the far focus plane are within the bounds of the near focus plan limit and far focus plane limit as illustrated in FIG. 7 (i.e., the near focus limit is at a distance from the imaging reader 106 that is equal to or greater than the distance of the near focus limit, and the far focus plane is at a distance less than or equal to the far focus limit away from the imaging reader 106). Having the near and far focus planes within the boundaries of the near and far focus plan limits allows for efficient decoding of indicia obtained in images of the indicia for identifying information pertaining to an OOI associated with the indicia.

At block 604, the imaging reader 106 obtains an first image of the OOI or target with the focus of the imaging read 106 set to a first focal distance being the near focal plane distance. The variable focus imaging controller 214 may control the actuator 215 and/or the variable focus optical element 208 to set the focal distance of the imaging reader 106 to the near focal plane for the imaging sensor 206 to obtain the image of the OOI. The imaging reader 106 then obtains a second image of an OOI with the focus of the imaging reader 106 set to a second focal distance being the far focal distance at block 606. The first and second images may be obtained from a single OOI in the field of view, or the first image may be obtained for a first OOI, and the second image may be obtained for a second OOI. In examples, the first focal distance may be the far focal distance, and the second focal distance may be the near focal distance. Additionally, the first and second focal distances may be any focal distances that are on either side of the center focal distance, and that bound a focus distance band that includes the central focal plane A (i.e., the band of distance between the near and far focal planes $A_n$ and $A_f$ respectively).

At 608, the processor determines a first image property value of the first image, and at 610 the processor determines a second image property value of the second image. For example, the first and second image property values may include one or more of an image contrast, resolution, sharpness, edge detection, frequency domain analysis, spatial Fourier transformation, a normalized sharpness, or another value associated with a property of an image or of image data. In a specific example, to determine the first and second image property values, the processor may determine a contrast value of every fourth pixel of the images obtained by the imaging reader 106. In embodiments, each pixel may be used, every other pixel, or any number of pixels for determining the first and second image property values. In the specific example, a Sobel operator is applied to determine the first derivative of the gradient of the pixels, with the resultant value being the image property value. The contrast of each image is normalized to ensure that the image property values are independent of any brightness or exposure differences between the obtained first and second images. The contrast is normalized by first subtracting the minimum pixel value from the mean pixel value, and then dividing all pixel values by the resulting difference.

In embodiments, the normalized sharpness may be used as the first and second image property values. The processor may calculate the normalized sharpness by $$S_n = \frac{mean(grad(I))}{std(I)},$$

where I denotes all pixel values in a region of interest of an image, and $S_n$ is the normalized sharpness value. Using the normalized sharpness as the first and/or second image property values may be advantageous because the value of a minimal black pixel value is not required as it is removed in the calculation of the standard deviation. While described above as a contrast value or a normalized sharpness value, the first and second image property values may be any value indicative of a property of an image or of image data. Further, a normalized value or contrast value may be calculated by methods and calculations that are different than the explicit examples described herein.

At 612, the processor determines an image quality metric from at least one of the first and/or second image property values. The image quality metric may be an indication of an image quality of the first image, an indication of image quality of the second image, or an indication of a comparison of the first and second image property values. For example, the image quality metric may be calculated directly from the first image property value, directly from the second image property value, include one or more of a difference between the first and second image property values, a summation of the first and second image property values, a quotient of the first and second image property values, an average of the first and second image property values, or the image quality metric may be based on a threshold or limit of the first and/or second image property values. In embodiments, it may be determined that a focus drift has not occurred if the first and second image property values are equal, or substantially equal (e.g., within less than 15% of each other, within 10% of each other, or within 5% of each other). In such an example a difference between the image property values results in an image quality metric equal to 0, or substantially close to 0 within a tolerance of 0, and a quotient of the first and second image property values would result in a value of 1, or substantially close to 1 within a tolerance.

At 614, the processor compares the image quality metric to a reference metric to determine if a focus drift occurred and, if so, how much of a focus drift occurred. The reference metric may be retrieved as a scanning parameter or as a calibration parameter as part of the scanning parameters at block 602. Further, the reference metric may be stored in the memory of the imaging reader 106, or may be retrieved by the imaging reader 106 from the memory of the server 112 or from another network or device.

To determine if a focus drift occurred and, if so, how much focus drift has occurred, the processor may compare the image quality metric directly to the reference metric, or to a threshold of the reference metric. The threshold of the reference metric may be indicative of a location of a focus plane that is between the near focus limit $A_{ni}$ and the near focus plane $A_n$, between the far focus limit $A_{fl}$ and the far focal plane $A_f$, between the near focus plane $A_n$ and the central focus plane A, or between the far focus plane $A_f$ and the central focal plane A. Therefore, the reference metric may be indicative of one or more of a drift of the near focus plane toward the near focus limit, a drift of the far focus plane toward the far focus limit, a drift of the near focus plane toward the central focal plane, or a drift of the far focus plane toward the central focal plane.

The threshold of the reference metric may be a distance threshold relative to the far focal plane with the threshold of the reference metric being indicative of the distance of (i) a focal plane between the far focal plane distance and the far focus limit, (ii) a focal plane between the far focal plane distance and the central focus plane distance, or (iii) a band of focal plane distances that includes the far focal plane distance. Similarly, the threshold of the reference metric may be a distance threshold relative to the near focal plane with the threshold of the reference metric being indicative of the distance of (i) a focal plane between the near focal plane distance and the near focus limit, (ii) a focal plane between the near focal plane distance and the central focus plane, or (iii) a band of focal plane distances that includes the near focal plane distance. Further, the threshold of the reference metric may be a distance threshold relative to the central focal plane with the threshold of the reference metric being indicative of the distance of (i) a focal plane between the central focal plane distance and the near focal plane distance, (ii) a focal plane between the central focal plane distance and the far focus plane distance, (iii) a focal plane between the central focal plane distance and the far focus limit, (iv) a focal plane between the central focal plane and the near focus limit, or (v) a band of focal plane distances that includes the central focal plane distance. At 616 the processor may determine whether the focus drift has occurred based on the comparison of the image quality metric to one or more example reference metrics.

In embodiments, the method 600 may include determining the reference metric. The imaging system may obtain a first reference image of a reference object, with the reference object placed at a pre-determined distance from the imaging reader 106. The reference object may be placed at a central focal plane distance A to provide a reference for objects that may be scanned at the central focal plane distance A. In embodiments, a single image of the reference object at the central focal plane distance A may be used to further determined the reference metric. In other embodiments, a first image is obtained with the imaging reader 106 having a focal distance at the near focal distance $A_n$, and the imaging reader 106 then obtains a second image of the reference object, with the second image being obtained at the far focal plane distance $A_f$. The processor determines a first reference image property value from the first image and a second reference image property value of the second image, and the processor then determines the reference metric from the first and second image property values. For example, the first and second image property values may each be an image sharpness value and the reference metric may be a difference between the first and second image property values. The first and second image property values may include one or more of a sharpness value, a contrast value, an image resolution, a spatial frequency content value, a noise measurement value, a dynamic range value, a measurement of image distortion, a blur value, a pixels per module value, or another value associated with an image or image quality. The reference metric may be a difference between the first and second image property values, a summation of the first and second image property values, a quotient of the first and second image property values, an average of the first and second image property values, the reference metric may be based on a threshold or limit of the first and second image property values. In embodiments, it may be determined that a focus drift has not occurred if the first and second image property values are equal, or substantially equal (e.g., within less than 15% of each other, within 10% of each other, or within 5% of each other). In such an example a difference between the image property values results in an image quality metric equal to 0, or substantially close to 0 within a tolerance of 0, and a quotient of the first and second image property values would result in a value of 1, or substantially close to 1 within a tolerance.

At 616 the processor determines whether a focus drift has occurred based on the comparison of the image quality metric to the reference metric. At 618 the processor may determine that a focus drift has not occurred when the image quality metric is within a threshold of the reference metric and ends the method at 620. For example, the image quality metric may be a sharpness value. At 618 the processor may determine that a focus drift has occurred when the image quality metric is outside of a threshold of the reference metric. Following the example above, if the image quality metric indicates that one of the image property values has increased while the other image property value has decreased than the focus has shifted toward the plane indicated by the larger of the two image property values. In some examples, one of the image property values may increase or decrease while the other image property value remains substantially the same which may indicate that the substantially similar image property value has remained within an image property value threshold, while the other image property value has increased or decreased beyond an image property threshold. For example, the far focal plane of the system may have increased beyond the far focus limit, while the near focal plane of the system remains within the near focal plane limit.

The reference metric may be indicative of a focus drift of the near focal plane toward the central focal plane, or of a drift of the far focal plane toward the central focal plane. For example, the reference metric may be indicative of a threshold of focus drift having a plane between the far focal plane and the central focal plane, and the processor may determine that the far focal plane has drifted toward the central focal plane by comparing the image quality metric with the reference metric. Similarly, the reference metric may be indicative of a focus plane that is between the near focus plan and the central focus plane, and the processor may determine that the near focus plane has drifted toward the central focus plane by comparing the image quality metric and the reference metric. The threshold of the reference metric may be a percentage of the reference metric, for example, the threshold may be ±1%, ±5%, ±10%, ±15%, ±20%, or less than ±50% of the reference metric.

The imaging reader 106 then adjusts the central focal plane A of the variable focus optical element 208 according to the determined focus drift. For example, the processor may analyze the comparison of the image quality metric and the reference metric to determine an amount of focus tuning to apply to the variable focus optical element 208. The processor may provide a signal and/or data indicative of a an amount of focus tuning to the variable focus imaging controller 214, the actuator 215, or directly to the variable focus optical element 208 to tune adjust the focus of the central focal plane A. Tuning the central focal plane may include providing a DC voltage to the actuator 215 or the variable focus optical element 208 (e.g., providing a voltage to a liquid lens, applying a voltage to another variable focus lens, or tuning another variable focus optical element), providing a control signal to the actuator 215 to reposition optical elements of the imaging stage 204 of the imaging reader 106, or another means for tuning the central focal plane.

Once the focus drift is determined, the processor may store the determined amount of focus drift, or a tuning amount, in the memory of the imaging reader 106, the memory of the server 112, or provide the amount of focus drift and/or tuning amount to another network or system. During the execution of the method 600 detectors (not illustrated) may determine different environmental factors and measure environmental variables such as an ambient temperature, a temperature of optics of the imaging reader 106, an environmental pressure, a humidity, an age of optics of the imaging reader 106, or other measurable factors. Values associated with the environmental factors may then be associated with a determined focus drift and/or tuning amount and the values associated with the environmental factors may also be stored in the memory of the imaging reader 106, the memory of the server 112, and/or provided to another network or system. When operating the imaging reader 106, sensors may measure current environmental conditions such as a current temperature of the imaging reader or current temperature of the environment, and the processor may retrieve a focus drift and/or tuning amount associated with that temperature. The processor may then provide the retrieved focus drift and/or tuning amount to the variable focus imaging controller 214, the actuator 215, the variable focus optical element 208, or other elements of the imaging reader 106 to tune the focus of the imaging reader 106 according to the previously determined focus drift.

While the steps in the blocks of the methods 400 and 600 are described as performed by various elements in the imaging reader device, any of these steps may be performed in a controller or a processor, whether through one or more dedicated controllers or processors or one or more elements that are configured to perform other processes described herein. Additionally, the controller 214 may include one or more processors and one or more memoires.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A computer-implemented method for differentiating focus drift of an imaging system from position changes of an object of interest, the method comprising:
   obtaining, by the imaging system, an image of an object of interest;
   identifying, by the processor, a region of interest in the image, wherein the region of interest contains an indicia indicative of the object of interest;
   determining, by the processor, an image quality of the image;
   analyzing, by the processor, the indicia and determining a pixel measurement of the indicia, and
   comparing, by the processor, the pixel measurement of the indicia to a reference pixel measurement; and
   based on the comparison, determining, by the processor, that the image quality of the image results from a difference in a distance of the object from the imaging system and a reference distance from the imaging system when the pixel measurement is outside of a threshold of the reference pixel measurement, and determining that the image quality of the image results from focusing drift of the imaging system when the pixel measurement is within a threshold of the reference pixel measurement.

2. The method of claim 1, wherein the reference pixel measurement is stored in a memory of the imaging system.

3. The method of claim 1, further comprising:
   obtaining, by the imaging system, an image of the reference indicia; and
   performing, by the processor, the reference pixel measurement on the reference indicia.

4. The method of claim 1, further comprising determining, by the processor and from the pixel measurement, a distance of the object of interest away from the imaging system; and
   wherein comparing the pixel measurement to the reference pixel measurement comprises:
   comparing, by the processor, the distance of the object of interest with a reference distance, the reference distance determined from the reference pixel measurement.

5. The method of claim 4, wherein determining that the image quality of the image results from a difference in distance between distance of the object and the reference distance comprises determining that the image quality of the image results from a difference in distance between the object and the reference distance when the distance of the object is outside of a threshold of the reference distance; and
   wherein determining that the image quality of the image results from focusing drift of the imaging system comprises determining that the image quality of the image results from focusing drift of the imaging system when the distance of the object is within a threshold of the reference distance.

6. The method of claim 1, wherein the indicia is one of a 1D barcode, 2D barcode, static QR code, dynamic QR code, or UPC code.

7. The method of claim 1, wherein performing the pixel measurement comprises performing a measurement of at least one of pixel sharpness, contrast, edge detection, size, a pixel resolution measurement, pixels per module, or image quality.

8. The method of claim 1, wherein the reference measurement is indicative of a reference pixel distance; and wherein the pixel measurement comprises determining, by the processor, a pixel distance between two pixels in the region of interest; and wherein comparing the pixel measurement of the indicia to a reference pixel measurement comprises comparing the pixel distance with the reference pixel distance; and wherein determining that the image quality of the image results from a difference in a distance of the object from the imaging system and a reference distance from the imaging system comprises determining, by the processor and from the comparison, that the image quality of the image results from a difference in a distance of the object from the imaging system and the reference distance when the pixel distance is outside of a threshold of the reference pixel distance; and wherein determining that the image quality of the image results from focusing drift of the imaging system comprises determining, by the processor and from the comparison, that the image quality of the image results from a focusing drift of the imaging system when the pixel distance is within of a threshold of the reference pixel distance.

\* \* \* \* \*